US012800430B2

(12) United States Patent
Sohn et al.

(10) Patent No.: US 12,800,430 B2
(45) Date of Patent: Nov. 17, 2026

(54) METHOD OF ESTIMATING ABSOLUTE STRAIN OF STRUCTURE REFERENCE-FREE USING ULTRASONIC WAVE VELOCITY, AND SYSTEM FOR THE SAME

(71) Applicant: Korea Advanced Institute of Science and Technology, Daejeon (KR)

(72) Inventors: Hoon Sohn, Daejeon (KR); Ohjun Kwon, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 430 days.

(21) Appl. No.: 18/508,651

(22) Filed: Nov. 14, 2023

(65) Prior Publication Data

US 2024/0175779 A1 May 30, 2024

(30) Foreign Application Priority Data

Nov. 29, 2022 (KR) ........................ 10-2022-0163281

(51) Int. Cl.
*G01M 7/02* (2006.01)

(52) U.S. Cl.
CPC .................................... *G01M 7/025* (2013.01)

(58) Field of Classification Search
CPC .... G01M 7/025; G01M 5/0066; G01M 7/022; G01B 17/04

(Continued)

(56) References Cited

U.S. PATENT DOCUMENTS 4,926,870 A * 5/1990 Brandenburger .... A61B 8/0875 600/437
2006/0236777 A1* 10/2006 Chambers .............. H04R 23/02 73/801

FOREIGN PATENT DOCUMENTS

JP 2017207441 A * 11/2017

OTHER PUBLICATIONS

Bray, Don E. Current Directions of Ultrasonic Stress Measurement Techniques, 15th World Conference on Nondestructive Testing, Oct. 2000, www.ndt.net/article/wcndt00/papers/idn647/idn647.htm#:~:text=THEORY,significant%20sensitivity%20to%20the%20deformation. (Year: 2000).*

(Continued)

*Primary Examiner* — Andrew Schechter
*Assistant Examiner* — Joshua L Forristall
(74) *Attorney, Agent, or Firm* — DALY, CROWLEY, MOFFORD & DURKEE, LLP

(57) ABSTRACT

Disclosed are method and system of estimating an absolute strain of a structure under tensile force in a reference-free manner using ultrasonic wave velocity. Ultrasonic vibrations are generated by a vibration exciting element attached to the structure, and first and second ultrasonic vibrations propagating in a tensile force direction and a direction orthogonal to the tensile force direction in the structure are detected using first and second vibration detection elements, respectively. The detected first and second ultrasonic vibration signals are converted into first and second digital signals. Then, a computing unit calculates propagation velocities of the first and second ultrasonic vibrations, and applies them to an equation of relationship between propagation velocities of ultrasonic vibrations and a strain of the structure to obtain an absolute strain of the structure in the x-direction due to the tensile force. The calculated absolute strain can be used to evaluate stability of the structure.

14 Claims, 7 Drawing Sheets

(58) Field of Classification Search
USPC .......................................................... 702/42
See application file for complete search history.

(56) References Cited

OTHER PUBLICATIONS

Ohjun Kwon, Hoon Sohn, Hyung Jin Lim, Ultrasonic-based tensile force estimation for cylindrical rod at various temperature conditions, Engineering Structures, vol. 265, 2022, 114509, ISSN 0141-0296, https://doi.org/10.1016/j.engstruct.2022.114509. (Year: 2022).*
P.R.L. Alves, J.S. Cunha Filho, M.G. Farinhas, A new approach to determine tensile stress states from the parameters of longitudinal waves, Applied Mathematical Modelling, vol. 83, 2020, pp. 189-201, ISSN 0307-904X, https://doi.org/10.1016/j.apm.2020.02.024. (Year: 2020).*

* cited by examiner (A)

(B)

METHOD OF ESTIMATING ABSOLUTE STRAIN OF STRUCTURE REFERENCE-FREE USING ULTRASONIC WAVE VELOCITY, AND SYSTEM FOR THE SAME

CROSS-REFERENCE TO RELATED APPLICATION

This U.S. non-provisional application claims priority under 35 USC § 119 from Korean Patent Application No. 10-2022-0163281, filed on Nov. 29, 2022 in the Korean Intellectual Property Office (KIPO), the disclosure of which is hereby incorporated by reference in its entirety.

BACKGROUND

1. Technical Field

The present invention relates to the field of structural health monitoring technology for structures, and more particularly to a technology for estimating absolute strain of a structure using ultrasonic wave velocity.

2. Description of the Related Art

In large-scale infrastructure members such as bridges, strain changes occur due to the self-weight of the structure and the expansion and contraction of the member due to seasonal temperature changes, in addition to operating loads applied by vehicles, etc. Especially for structures that have been used for a long time or exposed to disasters such as earthquakes, the distribution of strain applied to the member may change from the design value, and the strain may exceed the allowable strain and threaten the health (or stability) of the structure. Changes in the absolute strain of a member are the main cause of deformation, cracking, and sudden failure, and have a major impact on the health and service life of the structure. Therefore, it is necessary to develop a technology that continuously monitors the absolute strain.

For example, in the case of railroad rails, seasonal temperature changes cause expansion and contraction, which leads to localized high stresses and localized buckling. Measurement and monitoring of absolute strain in rails is very important for the stable operation of railway vehicles. Many studies have been conducted in Korea and around the world, but technologies that can be applied to actual railroad rails have not been developed. When large loads are applied to a structure, such as earthquakes, collisions by ship or aircraft, it is of great social and economic importance to quickly diagnose structural health and determine whether it can be used.

Attaching sensors to structures to monitor the absolute strain in members is a technology that is needed to address these issues. Strain gauges that are installed to monitor the load and strain applied to a structure do not measure the absolute strain because they measure the change in strain based on the stress and strain when the sensor is installed. Various techniques have been developed and used to measure the localized residual strain that occurs inside a material during welding, heat treatment, and machining and remains even in the absence of external loads. However, most of them can only be measured at the laboratory level using large and expensive equipment and cannot be utilized for continuous monitoring of infrastructure members in public use.

Strain is an important indicator used to evaluate the health of structures, and it is mainly known to estimate the strain of a structure using strain gauges. When the structure is deformed, the foil inside the structure is also deformed and the electrical resistance of the foil changes. Using the changed electrical resistance and the gauge factor of the strain gauge, the strain in the structure can be calculated. However, strain gauges can only measure strain after they are attached to a structure. Therefore, it is not possible to estimate the absolute strain, but only the relative strain, which is a disadvantage when applied to structures in public use. Since it is not possible to assess whether the relative strain is exceeding or not exceeding the tolerance limit of the structure's stability or health, the strain estimation technique using strain gauges is difficult to apply to structures in public use.

SUMMARY

It is an object of the present invention to provide a method for estimating the absolute strain of a structure in a reference-free and non-destructive manner using acoustoelastic effects.

It is another object of the present invention to provide a method and system for real-time monitoring of structural health by estimating the absolute strain of a structure in a reference-free and non-destructive manner using ultrasonic signals.

The objects of the present invention are not limited to those described above, and may be expanded in various ways without departing from the spirit and scope of the present invention.

A method of estimating an absolute strain of a structure under a tensile force according to embodiments of the present invention includes detecting a propagation velocity $$(c_{xx}^F)$$

of a first ultrasonic vibration propagating in a tensile force direction and a propagation velocity $$(c_{yy}^F)$$

of a second ultrasonic vibration propagating in another direction orthogonal to the tensile force direction in the structure by applying ultrasonic vibrations to the structure; and calculating, with a processor, an absolute strain ($\varepsilon_x$) of the structure in the tensile force direction due to the tensile force using the detected propagation velocities $$(c_{xx}^F, c_{yy}^F)$$

of the first and second ultrasonic vibrations and a relationship between propagation velocities of the ultrasonic vibrations and a strain in the structure.

In an exemplary embodiment, the relationship may be defined by an equation, $$\varepsilon_x = \frac{\left(\frac{c_{yy}^F}{c_{xx}^F}\right)^2 - 1}{21\left[\left(\frac{c_{yy}^F}{c_{xx}^F}\right)^2 + v\right]},$$

where v is a Poisson's ratio of the structure.

In an exemplary embodiment, the 'detecting propagation velocities' may include inputting an ultrasonic signal generated by a waveform generator to a vibration exciting element fixed to the structure to cause the vibration exciting element to generate ultrasonic vibrations to be propagated within the structure; detecting the first and second ultrasonic vibrations by first and second vibration detection elements installed at first and second positions of the structure, respectively, to output corresponding first and second analog electrical signals, respectively, wherein the first position is spaced apart from the vibration exciting element by a first predetermined distance in the tensile force direction of the tensile force, and the second position is spaced apart from the vibration exciting element by a second predetermined distance in the another direction orthogonal to the tensile force direction; converting the first and second analog electrical signals, by a digitizing unit, provided from the first and second vibration detection elements to first and second digital signals; and calculating the propagation velocities $$(c_{xx}^F, c_{yy}^F)$$

of the first and second ultrasonic vibrations using the first and second digital signals by executing an absolute strain estimation program with the processor.

In an exemplary embodiment, the propagation velocity $$(c_{xx}^F)$$

of the first ultrasonic vibration may be calculated by dividing the first predetermined distance by a first arrival time taken for the first ultrasonic vibration to propagate from the vibration exciting element to the first vibration detection element, and the propagation velocity $$(c_{yy}^F)$$

of the second ultrasonic vibration may be calculated by dividing the second predetermined distance by a second arrival time taken for the second ultrasonic vibration to propagate from the vibration exciting element to the second vibration detection element.

In an exemplary embodiment, the first arrival time may be determined by a first time difference between a departure time of the first ultrasonic vibration from the vibration exciting element and a first arrival time at the first vibration detection element, and the second arrival time may be determined by a second time difference between the departure time and a second arrival time of the second ultrasonic vibration at the second vibration detection element, wherein the first and second arrival times may be determined based on peak points of the first and second ultrasonic vibrations.

In an exemplary embodiment, the method for estimating the absolute strain of the structure may further include assessing stability of the structure by evaluating the calculated absolute strain ($\varepsilon_x$) of the structure in the tensile force direction based on a predetermined criterion.

In an exemplary embodiment, the 'assessing stability of the structure' may include comparing the calculated absolute strain ($\varepsilon_x$) of the structure in the tensile force direction with an elastic limit of the structure on a stress-strain curve of the structure to obtain a strain margin of the structure; determining that if the obtained strain margin is less than a reference value, stability of the structure is low enough to require measures to improve health of the structure; and determining that if the obtained strain margin is greater than the reference value, the structure is healthy.

Meanwhile, a system for estimating an absolute strain of a structure under a tensile force according to embodiments of the present invention includes a velocity detection unit, and a strain calculating unit. The velocity detection unit is configured to detect a propagation velocity $$(c_{xx}^F)$$

of a first ultrasonic vibration propagating in a tensile force direction and a propagation velocity $$(c_{yy}^F)$$

of a second ultrasonic vibration propagating in another direction orthogonal to the tensile force direction in the structure by applying ultrasonic vibrations to the structure. The strain calculating unit is configured to calculate an absolute strain ($\varepsilon_x$) of the structure in the tensile force direction due to the tensile force using the detected propagation velocities $$(c_{xx}^F, c_{yy}^F)$$

of the first and second ultrasonic vibrations and a relationship between propagation velocities of the ultrasonic vibrations and a strain in the structure.

In an exemplary embodiment, the velocity detection unit may include a waveform generator, a vibration exciting element, a first vibration detection element, and a second vibration detection element. The waveform generator may be configured to generate an ultrasonic vibration exciting signal. The vibration exciting element may be attached to the structure and configured to be vibrated by the ultrasonic vibration exciting signal from the waveform generator to cause vibrations to be propagated within the structure. The first vibration detection element may be installed at a first position of the structure spaced apart from the vibration exciting element by a first predetermined distance in the tensile force direction and configured to detect a first ultrasonic vibration propagating in the tensile force direction and to output a corresponding first analog signal. The second vibration detection element may be installed at a second position of the structure spaced apart from the vibration exciting element by a second predetermined distance in the another direction orthogonal to the tensile force direction and configured to detect a second ultrasonic vibration propagating in the another direction orthogonal to the tensile force direction, and to output a corresponding second analog signal.

In an exemplary embodiment, the strain calculating unit may include a digitizing unit and a computing unit. The digitizing unit may be configured to convert the first and second analog signals into first and second digital signals, respectively. The computing unit may be configured to perform functions of calculating, by executing an absolute strain estimation program, the propagation velocity $$(c_{xx}^F)$$

of the first ultrasonic vibration and the propagation velocity $$(c_{yy}^F)$$

of the second ultrasonic vibration after receiving the first and second digital signals from the digitizing unit; and applying the calculated propagation velocities $$(c_{xx}^F,\ c_{yy}^F)$$

of the first and second ultrasonic vibrations to the relationship to calculate the absolute strain ($\varepsilon_x$) of the structure in the tensile force direction.

In an exemplary embodiment, the relationship may be defined by an equation, $$\varepsilon_x = \frac{\left(\frac{c_{yy}^F}{c_{xx}^F}\right)^2 - 1}{21\left[\left(\frac{c_{yy}^F}{c_{xx}^F}\right)^2 + v\right]},$$

where v is a Poisson's ratio of the structure.

In an exemplary embodiment, in the computing unit, the propagation velocity $$(c_{xx}^F)$$

of the first ultrasonic vibration may be calculated by dividing the first predetermined distance by a first arrival time taken for the first ultrasonic vibration to propagate from the vibration exciting element to the first vibration detection element, and the propagation velocity $$(c_{yy}^F)$$

of the second ultrasonic vibration is calculated by dividing the second predetermined distance by a second arrival time taken for the first ultrasonic vibration to propagate from the vibration exciting element to the second vibration detection element.

In an exemplary embodiment, the first arrival time may be determined by a first time difference between a departure time of the first ultrasonic vibration from the vibration exciting element and a first arrival time at the first vibration detection element, and the second arrival time may be determined by a second time difference between the departure time and a second arrival time of the second ultrasonic vibration at the second vibration detection element, wherein the first and second arrival times may be determined based on peak points of the first and second ultrasonic vibrations.

In an exemplary embodiment, the digitizing unit may include a first digitizing unit configured to receive the first analog signal from the first vibration detection element and convert the first analog signal to the first digital signal; and a second digitizing unit configured to receive the second analog signal from the second vibration detection element and convert the second analog signal to the second digital signal.

In an exemplary embodiment, the computing unit may be configured to further perform a function of assessing stability of the structure by evaluating the calculated absolute strain ($\varepsilon_x$) of the structure in the tensile force direction based on a predetermined criterion.

In an exemplary embodiment, the function of 'assessing stability of the structure' may include comparing the calculated absolute strain ($\varepsilon_x$) of the structure in the tensile force direction with an elastic limit of the structure on a stress-strain curve of the structure to obtain a strain margin of the structure; determining that if the obtained strain margin is less than a reference value, stability of the structure is low enough to require measures to improve health of the structure; and determining that if the strain margin is greater than the reference value, the structure is healthy.

In an exemplary embodiment, the computing unit may include: a clock generator configured to generate a clock signal used as a reference for operations; and a processing device configured to execute the absolute strain estimation program, to perform operations to calculate, based on the clock signal, the propagation velocities $$(c_{xx}^F,\ c_{yy}^F)$$

of the first and second ultrasonic vibrations and the absolute strain ($\varepsilon_x$) of the structure in the tensile force direction, and to control the waveform generator to generate the ultrasonic vibration exciting signal.

In an exemplary embodiment, the vibration exciting element and the first and second vibration detection elements may be elements made from piezoelectric ceramic (PZT) material.

According to exemplary embodiments of the present invention, a reference-free absolute strain of structures can be estimated using acoustoelastic effect. That is, the present invention provides a previously unknown relationship between a strain due to a tensile force and the longitudinal waves velocity of an ultrasonic wave for the first time taking into account the change in elastic modulus, and can estimate the absolute strain of the structures reference-free using the relationship.

The conventional methods for estimating the absolute strain by accessing large structures by humans or unmanned inspection equipment have the disadvantage that they cannot be monitored at all times, but the absolute strain estimation technique according to embodiments of the present invention enables constant monitoring of the absolute strain of a structure using sensors.

The absolute strain estimation according to embodiments of the present invention is carried out in a way of non-destructive to the structure, i.e., it utilizes acoustoelastic effects to monitor the structural health, so that the monitoring does not cause damage to structures.

DETAILED DESCRIPTION OF THE EMBODIMENTS

Figure 1:
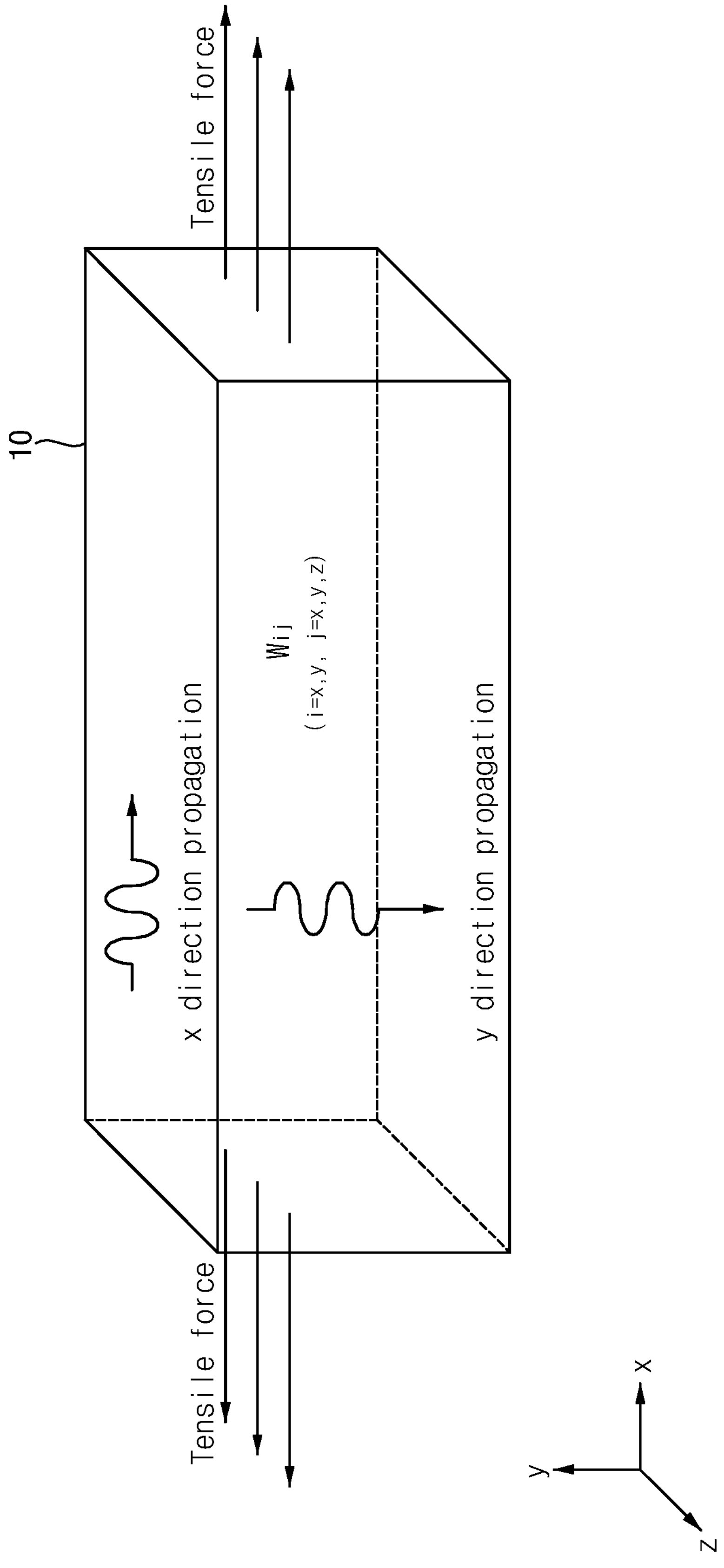
FIG. 1 shows the propagation of ultrasonic waves in a structure subjected to a tensile force.

Hereinafter, preferred embodiments of the present invention will be described in more detail with reference to the accompanying drawings. Identical components in the drawings are designated by the same reference numerals, and duplicate descriptions of the same component are omitted.

The terminology used in the present invention is used to describe specific embodiments only and is not intended to limit the invention. The singular expression includes the plural unless the context clearly indicates otherwise. In this application, the terms 'includes' or 'have' and the like are intended to designate the presence of the features, numbers, steps, actions, components, parts, or combinations thereof set forth in the specification, and are not intended to preclude the possibility of the presence or addition of one or more other features, numbers, steps, actions, components, parts, or combinations thereof. Further, terms such as first, second, and the like may be used to describe various components, but the components are not to be limited by such terms. The terms are used only for the purpose of distinguishing one component from another.

Assuming that there is a predetermined relationship between the velocity of the ultrasonic waves and the absolute strain of the structure, the present inventors have derived a new equation that defines the relationship between them. This will be described first below.

Figure 2:
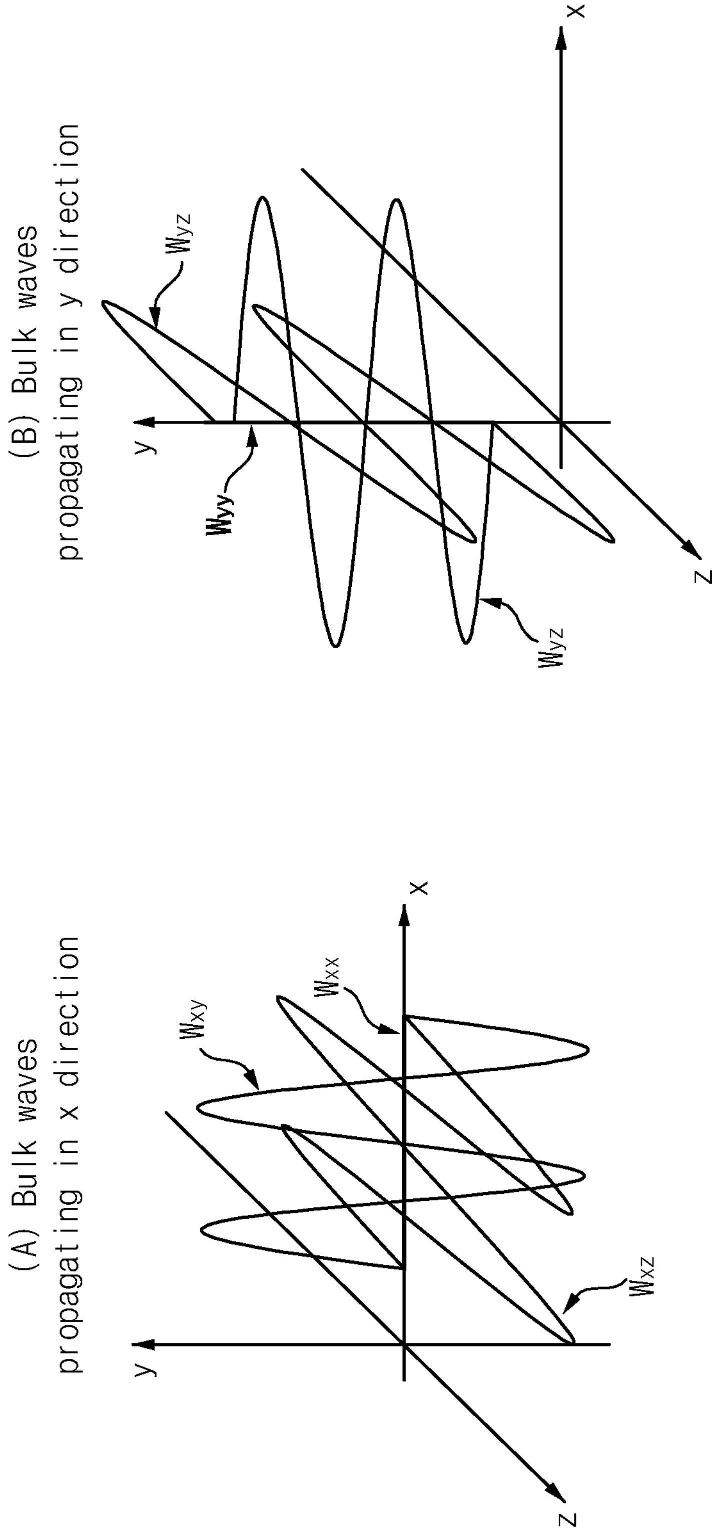
FIG. 2 illustrates ultrasonic waves propagating in the x- and y-directions within the structure.

FIG. 1 shows the propagation of ultrasonic waves in a structure subjected to a tensile force. FIG. 2 illustrates ultrasonic waves propagating in the x- and y-directions within the structure.

Referring to FIGS. 1 and 2, when a tensile force is applied to a structure 10, for example in the x-direction, ultrasonic waves propagate in three directions: the x-direction, the y-direction, and the z-direction. The ultrasonic waves can be divided into a total of six waves ($W_{xx}$, $W_{xy}$, $W_{xz}$, $W_{yx}$, $W_{yy}$, and $W_{yz}$) as shown in FIG. 2, depending on the direction in which the waves travel (x- and y-directions) and the direction in which they vibrate (x-, y-, and z-directions). In the figures, the first part of the subscript indicates the direction in which the ultrasonic wave propagates, and the second part indicates the direction in which the ultrasonic wave vibrates. Since the ultrasonic waves propagating in the y- and z-directions are the same, here only one of them, e.g., the ultrasonic wave propagating in the y-direction, and the ultrasonic wave propagating in the x-direction may be considered. In this embodiment, absolute strain estimation may be performed using the longitudinal waves that have the same direction of travel and direction of vibration among the six ultrasonic waves, i.e., the x-directional wave $W_{xx}$ and the y-directional wave $W_{yy}$.

The propagation velocity of the longitudinal waves may be determined by the Poisson's ratio, the density, and elastic modulus of the structure 10, and can be expressed as Equation (1) below. When the structure 10 is not under tensile force, the propagation velocities of the x- and y-directional longitudinal waves $W_{xx}$ and $W_{yy}$ are the same as follows, $$c_{xx} = c_{yy} = \sqrt{\frac{E(1-\nu)}{(1+\nu)(1-2\nu)\rho}}, \tag{1}$$

where $c_{ii}$ is the propagation velocity of wave $W_{ii}$ (where i=x, y), E is an initial elastic modulus of the structure 10, ν is the Poisson's ratio of the structure 10, and ρ is the initial density of the structure 10.

When a tensile force is applied to the structure 10 in the x-direction, the elastic modulus and density of the structure 10 may change, which causes changes in the velocity of the longitudinal waves. The density changes the same regardless of the direction, but the elastic modulus changes differently depending on the direction, so the velocity of the propagating longitudinal wave varies depending on the direction. When a tensile force is applied to the structure 10, the propagation velocity of the x-directional wave $W_{xx}$ becomes faster than when there is no tensile force, and the propagation velocity of the y-directional wave $W_{yy}$ becomes slower than when there is no tensile force. The x-directional velocity $$c_{xx}^F$$

and y-directional velocity $$c_{yy}^F$$

of the longitudinal wave by the tensile force can be expressed as follows, $$c_{xx}^F = \sqrt{\frac{E_{xx}^F(1-\nu)}{(1+\nu)(1-2\nu)\rho^F}} \tag{2-1}$$

and $$c_{yy}^F = \sqrt{\frac{E_{yy}^F(1-\nu)}{(1+\nu)(1-2\nu)\rho^F}}, \tag{2-2}$$

where $$E_{xx}^F \text{ and } E_{yy}^F$$

are the x- and y-directional elastic moduli changed by the tensile force, respectively, and $\rho^F$ is the density changed by the tensile force.

Assuming that the change in the Poisson's ratio and in the density of the structure 10 are the same in both directions, the velocity ratio between the longitudinal waves $W_{xx}$ and $W_{yy}$ propagating in the x- and y-directions changed by the tensile force can be expressed as the ratio of the elastic modulus changed by the tensile force, as shown in Equation (3), $$\frac{c_{yy}^F}{c_{xx}^F} = \sqrt{\frac{E_{yy}^F}{E_{xx}^F}} = \sqrt{\frac{E+\Delta E_{yy}}{E+\Delta E_{xx}}} = \sqrt{\frac{1+\frac{\Delta E_{yy}}{E}}{1+\frac{\Delta E_{xx}}{E}}}, \tag{3}$$

where $\Delta E_{xx}$ and $\Delta E_{yy}$ represent the amounts of change in elastic modulus in the x- and y-directions due to the tensile force, respectively.

The relative change in elastic modulus due to the tensile force may be written as follows.

$$\frac{\Delta E_{xx}}{E} = -21\varepsilon_x \tag{4-1}$$

and $$\frac{\Delta E_{yy}}{E} = -21\varepsilon_y = 21\nu\varepsilon_x, \tag{4-2}$$

where $\varepsilon_x$ and $\varepsilon_y$ are the strains in the x- and y-directions of the structure 10 due to the tensile force applied to the structure 10.

By substituting Equations (4-1) and (4-2), the relationship between the strain and the relative change in the elastic modulus due to the tensile force, into Equation (3), the relationship between the x-directional strain $\varepsilon_x$ and the velocity ratio $c^F_{yy}/c^F_{xx}$ of the bulk longitudinal waves propagating in the x- and y-directions can be obtained as follows, $$\frac{c_{yy}^F}{c_{xx}^F} = \sqrt{\frac{1+21\nu\varepsilon_x}{1-21\nu\varepsilon_x}} \tag{5-1}$$

or

-continued $$\varepsilon_x = \frac{\left(\frac{c_{yy}^F}{c_{xx}^F}\right)^2 - 1}{21\left[\left(\frac{c_{yy}^F}{c_{xx}^F}\right)^2 + \nu\right]}. \tag{5-2}$$

The Poisson's ratio of the structure is the ratio between the transverse strain and the longitudinal strain when the material of the structure is stretched in that direction under the action of the tensile force, and may be given as a known value depending on the type of material. Therefore, by measuring the propagation velocities of ultrasonic vibrations propagating in the tensile force direction (e.g., x-direction) and in the direction orthogonal to the tensile force direction (e.g., y-direction) in the structure, that is, the propagation velocities $$c_{xx}^F \text{ and } c_{yy}^F$$

of the longitudinal waves $W_{xx}$ and $W_{yy}$, respectively, the absolute strain $\varepsilon_x$ generated in the structure can be estimated. Furthermore, the estimated absolute strain may be used to assess the structural health or stability.

The propagation velocity of an ultrasonic wave propagating in an arbitrary-direction may be calculated using Equation (6), $$c_{ii}^F = \frac{d_{ii}}{t_{ii}}, \tag{6}$$

where, $d_{ii}$ and $t_{ii}$ represent the propagation distance of the ultrasonic wave propagating in i-direction (i includes x and y) and the travel time required to travel the propagation distance, respectively. The propagation distance of the ultrasonic wave may be substantially equal to the actual distance between a vibration exciting element and a vibration detection device, and the travel time of the ultrasonic wave may be the time difference between the vibration start time of the vibration exciting element and the vibration detection time of the vibration detection device. The vibration start time and the vibration detection time may be measured using a clock signal based on the peak points of the ultrasonic vibration exciting signal and the detected ultrasonic vibration signal.

When the propagation velocity $$c_{xx}^F$$

of the x-directional longitudinal wave $W_{xx}$ and the propagation velocity $$c_{yy}^F$$

of the y-directional wave $W_{yy}$ of the ultrasonic wave are obtained using Equation (6), the absolute strain of the structure 10 can be calculated by substituting the obtained propagation velocities $$c_{xx}^F \text{ and } c_{yy}^F$$

of the longitudinal waves $W_{xx}$ and $W_{yy}$, together with the magnitude of the Poisson's ratio v of the structure 10, into Equation (5-2).

On the other hand, the density and elastic modulus of the structure also change due to temperature changes, so we will examine the effect of temperature to improve field applicability. The density change with temperature is also the same regardless of the direction, so the velocity ratio between the longitudinal waves can still be expressed as a function of the elastic modulus regardless of temperature. According to the Lennard-Jones Potential, the elastic modulus can be expressed as Equation (7), $$E(r) = \epsilon\left[156\frac{r_m^{12}}{r^{14}} - 84\frac{r_m^6}{r^8}\right], \tag{7}$$

where ε is the depth of the potential well, $r_m$ is the distance between atoms, and r represents the atomic equilibrium distance.

In Equation (7), the variable affected by the tensile force is r, and the variables affected by temperature are ε and $r_m$. That is, affecting variables are different from each other. Taking this into account, the relationship between the velocity ratio between the longitudinal waves and strain in the structure under tensile force and temperature changes is reformulated as Equation (8), $$\frac{c_{yy}^F}{c_{xx}^F} = \sqrt{\frac{E_{yy}^F}{E_{xx}^F}} = \sqrt{\frac{1+21\nu\varepsilon_x'}{1-21\nu\varepsilon_x'}},\ \varepsilon_x' = \frac{\varepsilon_x}{(1+\alpha\Delta T)}, \tag{8}$$

where α is the coefficient of thermal expansion and ΔT is the amount of temperature change.

The coefficient of thermal expansion of steel, which is commonly used in structures, is $1.3e^{-5}$. Assuming that the temperature of the structure has changed by 50° C., the estimated strain should be multiplied by a correction value of about 1.0007. This correction value is so small that it is negligible, i.e., for a temperature change in the natural state of the structure, the magnitude of the additional strain caused by the amount of temperature change is so small that the error in strain due to temperature change is almost negligible. Therefore, the technology according to an embodiment of the present invention can be regarded as a technology suitable for monitoring the long-term strain of a structure by applying it in the field. Equation (5-2) may be used to calculate the absolute strain of a structure without temperature correction.

Figure 3:
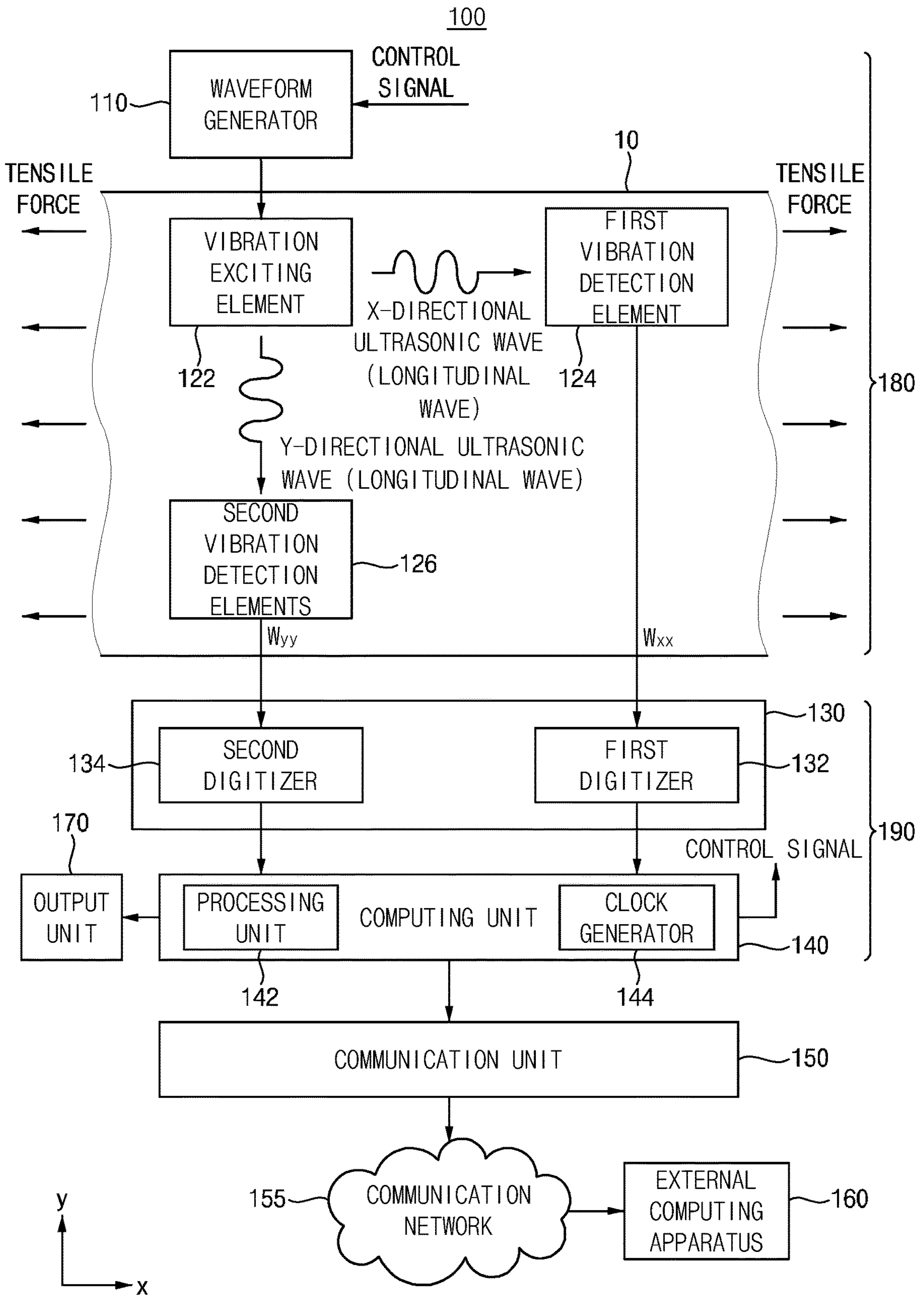
FIG. 3 is a block diagram illustrating a configuration of a system for estimating an absolute strain of the structure according to an exemplary embodiment of the present invention.

Next, FIG. 3 schematically illustrates a configuration of a system for estimating an absolute strain of the structure according to an exemplary embodiment of the present invention.

Referring to FIG. 3, the absolute strain estimation system 100 may include a velocity detecting unit 180 and a strain calculating unit 190. The velocity detecting unit 180 may include a waveform generator 110, a vibration exciting element 122, and first and second vibration detection elements 124, 126. The strain calculating unit 190 may include a digitizing unit 130, and a computing unit 140.

The velocity detection unit 180 may be configured to detect a propagation velocity $$(c_{xx}^F)$$

of a first ultrasonic vibration propagating in a tensile force direction and a propagation velocity $$(c_{yy}^F)$$

of a second ultrasonic vibration propagating in another direction orthogonal to the tensile force direction in the structure by applying ultrasonic vibrations to the structure. The strain calculating unit may be configured to calculate, an absolute strain ($\varepsilon_x$) of the structure in the tensile force direction due to the tensile force using the detected propagation velocities $$(c_{xx}^F,\ c_{yy}^F)$$

of the first and second ultrasonic vibrations and a relationship between propagation velocities of the ultrasonic vibrations and a strain in the structure.

In details, the waveform generator 110 may generate and provide an ultrasonic vibration exciting signal to the vibration exciting element 122. The ultrasonic vibration exciting signal generated by the waveform generator 110 may be, for example, a signal of a three-cycle tone burst, but is not limited to this, and may be any signal that can cause the vibration exciting element 122 to be ultrasonically vibrated.

The vibration exciting element 122 may be a device that generates vibrations in response to the ultrasonic vibration exciting signal input from the waveform generator 110. The vibration exciting element 122 may be tightly attached to any position on the structure 10 to transmit vibrations to the structure 10 to be monitored. A representative example of the vibration exciting element 122 may be a piezoelectric ceramic (PZT) element.

Each of the first and second vibration detection elements 124, 126 may be a device capable of generating an analog electrical signal corresponding to the mechanical vibration as an output signal when the mechanical vibration is input. Their representative example may be a piezoelectric ceramic (PZT) device that generates a voltage signal corresponding to an applied pressure (vibration).

The first and second vibration detection elements 124, 126 may be installed in close contact with the surface of the structure 10, at two positions spaced apart from the vibration exciting element 122 by a first and second predetermined distance, respectively. Specifically, the first vibration detection element 124 may be installed at a first position spaced apart by a predetermined distance from the vibration exciting element 122 in the direction of a tensile force (x-direction in FIG. 3) applied to the structure 10, and the second vibration detection element 126 may be installed at a second position spaced apart by a predetermined distance from the vibration exciting element 122 in a direction (y-direction in FIG. 3) orthogonal to the tensile force direction. The first and second vibration detection elements 124, 126 can detect ultrasonic vibrations propagating in the x-direction and y-direction and output corresponding first and second analog electrical signals, respectively.

The digitizing unit 130 may convert the first and second analog electrical signals output by the first and second vibration detection elements 124, 126 into first and second digital signals. In one example, the digitizing unit 130 may include a first digitizer 132 and a second digitizer 134. The first digitizer 132 and the second digitizer 134 may be electrically connected to the first vibration detector element 124, and the second vibration detector element 126, respectively. The first digitizer 132 may convert a first analog electrical signal from the first vibration detection element 124 into a first digital signal, and the second digitizer 134 may convert a second analog electrical signal from the second vibration detection element 126 into a second digital signal. The first and second digital signals converted by the first and second digitizers 132, 134 are digital signals corresponding to an x-direction vibration (longitudinal wave) and a y-direction vibration (longitudinal wave), respectively. In another example, the digitizing unit 130 may have a configuration comprising a digitizer (not shown) and a time delayer (not shown). The time delayer may time-delay either of the first and second analog electrical signals so that they are sequentially input to the digitizer, thereby sequentially converting the first and second analog electrical signals into the first and second digital signals.

The computing unit 140 may include, for example, a processing unit 142 capable of executing a computer program, a clock generator 144, and a computer program implementing the absolute strain estimation method described herein (hereinafter referred to as an 'absolute strain estimation program').

The clock generator 144 may generate a clock signal. The clock signal generated by the clock generator 144 may be used as a master clock signal for the entire absolute strain estimation system 100. Thus, the waveform generator 110, the first and second digitizers 132, 134, and the processing unit 142 may all perform operations synchronized to that clock signal.

The processing unit 142 may be electrically connected to the digitizing unit 130 and the waveform generator 110. Based on the clock signal, the processing unit 142 may receive first and second digital signals from the first and second digitizers 132, 134, respectively and may provide a control signal to the waveform generator 110 to control the waveform generator 110 to generate an ultrasonic vibration exciting signal. The processing unit 142 may be implemented using one or more general purpose computing devices or special purpose computing devices, such as, for example, a processor, controller, arithmetic logic unit (ALU), digital signal processor, microcomputer, field programmable array (FPA), programmable logic unit (PLU), microprocessor, or any other device capable of executing and responding to instructions. The processing unit 142 may include memory to access, store, manipulate, process, and generate data in response to execution of the absolute strain estimation program. The processing unit 142 may execute an operating system (OS) and the absolute strain estimation program executed on the operating system. Through the execution of the absolute strain estimation program, the propagation velocity of the ultrasonic vibration in the tensile force direction (x-direction) and the orthogonal direction (y-direction) to the tensile force direction (x-direction) can be obtained, and the absolute strain of the structure 10 can be calculated using the obtained propagation velocity values and the previously derived absolute strain relationship equation (5-2).

The absolute strain estimation program may be recorded on a computer-readable storage medium. Examples of the computer-readable storage media may include magnetic media such as hard disks, floppy disks, and magnetic tapes, optical media such as CD-ROMs and DVDs, magneto-optical media such as floptical disks, and hardware devices specifically configured to store and execute program instructions such as ROMs, RAMs, flash memory, and the like.

Specifically, the processing unit 142 may utilize the clock signal to determine the time that the waveform generator 110 applied the ultrasonic vibration exciting signal to the vibration exciting element 122. Further, the processing unit 142 can use the clock signal to determine a time when the first vibration detection element 124 detects an ultrasonic vibration propagating in the tensile force direction (x-direction) and a time when the second vibration detection element 126 detects an ultrasonic vibration propagating in a direction orthogonal to the tensile force direction (y-direction). Since the time of generating the ultrasonic vibration and the time of detecting the ultrasonic vibration propagating through the structure 10 are known, and the propagation distances of the ultrasonic vibration in the tensile force direction (x-direction) and the orthogonal direction (y-direction) are known values, the processing unit 142 can obtain propagation velocities of the ultrasonic vibration in the tensile force direction (x-direction) and its orthogonal direction (y-direction).

The absolute strain estimation system 100 may further include a communication unit 150 connected to the computing unit 140. The communication unit 150 may communicate with an external computing apparatus 160 via the communication network 155 under the control of the computing unit 140. For example, the communication unit 150 may perform communication tasks such as transmitting the absolute strain obtained by the computing unit 140 to the external computing apparatus 160, receiving requests, instructions, information, etc. sent from the external computing apparatus 160, and relaying the same to the computing unit 140. In this way, the external computing apparatus 160 can communicate with the absolute strain estimation system 100 via the communication unit 150 to monitor the health or stability of the structure 10 in real time.

The absolute strain estimation system 100 may further include an output unit 170 that is connected to the computing unit 140 and outputs information, such as a health or stability assessment result of the structure 10, provided by the computing unit 140.

Figure 4:
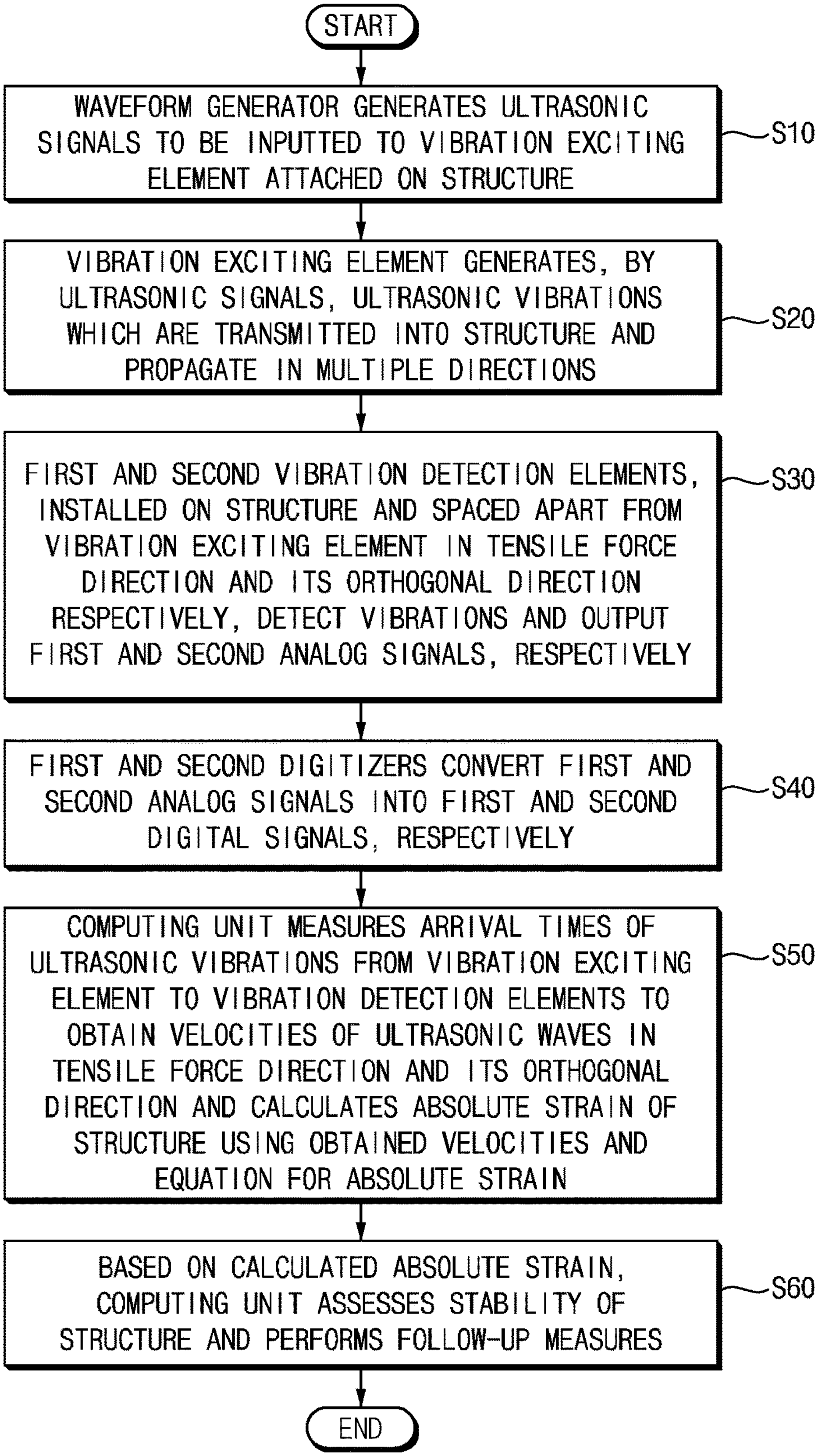
FIG. 4 is a flow diagram illustrating a procedure for executing an absolute strain estimation program to perform absolute strain estimation and assessment of structural health according to an exemplary embodiment of the present invention.

FIG. 4 illustrates a procedure for executing an absolute strain estimation program to estimate an absolute strain of the structure and assess the health or stability of the structure according to an exemplary embodiment of the present invention.

To estimate the absolute strain of any structure 10, the absolute strain estimation system 100, such as that described in FIG. 3, may be used. First, the vibration exciting element 122 and first and second vibration detection elements 124, 126 may be installed on the structure 10 as described above. Further, the waveform generator 110 and the vibration exciting element 122 are electrically connected to each other, and the first and second vibration detection elements 124, 126 are electrically connected to first and second digitizers 132, 134, respectively. A processor in the computing unit 140 may be connected to the first and second digitizers 132, 134.

In the absolute strain estimation system 100, the waveform generator 110 may generate ultrasonic signals and input them to the vibration exciting element 122 (step S10). In one embodiment, the processing unit 142 of the computing unit 140 may provide the waveform generator 110 with a control signal instructing the waveform generator 110 to generate the ultrasonic signal in synchronization with the clock signal from the clock generator 144, and the waveform generator 110 may generate the ultrasonic signal in response to the control signal. The processing unit 142 can determine when the device 122 begins to vibrate, i.e., the start time of the ultrasonic vibrations as the ultrasonic signal is input to the device 122 using the clock signal.

Once the ultrasonic signal is input, the vibration exciting element 122 can generate ultrasonic vibrations according to the ultrasonic signal. The ultrasonic vibrations generated by the vibration exciting element 122 may be transmitted to the structure 10 and propagate in multiple directions, such as wave propagation along the structure 10 due to acoustic elasticity effects (step S20).

Of the ultrasonic vibrations propagating within the structure 10, ultrasonic vibrations propagating in the tensile force direction (x-direction) may be applied to the first vibration detection element 124, and ultrasonic vibrations propagating in the orthogonal direction (y-direction) of the tensile force direction may be applied to the second vibration detection element 126. The first and second vibration detection elements 124, 126 may, when ultrasonic vibrations propagating in the tensile force direction (x-direction) and the orthogonal direction (y-direction) are input respectively, output first and second analog electrical signals corresponding to the ultrasonic vibrations, respectively, by piezoelectric effect (step S30).

The first analog electrical signal output from the first vibration detection element 124 may be transmitted to the first digitizer 134 and converted into a first digital electrical signal. The second analog electrical signal output from the second vibration detection element 126 may be transmitted to the second digitizer 136 and converted into a second digital electrical signal (step S40).

The first and second digital signals converted by the first and second digitizers 134, 136 may be provided to the processing unit 142 of the computing unit 140, which is executing the absolute strain rate estimation program. According to the algorithm of the absolute strain estimation program, the processing unit 142 of the computing unit 140 may perform a number of operations to obtain the health or stability assessment data of the structure 10 using the first and second digital signals.

First, the processing unit 142 of the computing unit 140 may calculate the propagation velocities $$c_{xx}^F \text{ and } c_{yy}^F$$

of the longitudinal waves $W_{xx}$ and $W_{yy}$ propagating in the x- and y-directions in the structure 10, respectively, by measuring the arrival times of the ultrasonic vibrations using the first and second digital signals (step S50).

Specifically, using Equation (6) as previously described, the propagation velocities $$c_{xx}^F \text{ and } c_{yy}^F$$

of the x-directional longitudinal wave $W_{xx}$ and the y-directional longitudinal wave $W_{yy}$ of the ultrasonic wave can be expressed as follows, $$c_{xx}^F = \frac{d_{xx}}{t_{xx}} \tag{9-1}$$

and $$c_{yy}^F = \frac{d_{yy}}{t_{yy}}, \tag{9-2}$$

where $d_{xx}$ and $d_{yy}$ represent the x- and y-directional propagation distances of the ultrasonic vibration, respectively, and $t_{xx}$ and $t_{yy}$ represent the times taken for the ultrasonic vibration to travel the x- and y-directional propagation distances $d_{xx}$ and $d_{yy}$, respectively.

The propagation distance $d_{xx}$ of the x-directional longitudinal wave $W_{xx}$ of the ultrasonic wave is equal to the separation distance from the vibration exciting element 122 to the first vibration detection element 124, and the propagation distance $d_{yy}$ of the y-directional wave $W_{yy}$ of the ultrasonic wave is equal to the separation distance from the vibration exciting element 122 to the second vibration detection element 126. These two propagation distances $d_{xx}$ and $d_{yy}$ may be values that are automatically determined when the installation positions of the vibration exciting element 122 and the first and second vibration detection elements are specified.

The first arrival time $t_{xx}$ of the x-directional ultrasonic vibration may be determined as the first time difference between the departure time of the x-directional ultrasonic vibration from the vibration exciting element 122 and the first arrival time of the x-directional ultrasonic vibration at the first vibration detection element 124. Further, the second arrival time $t_{yy}$ of the y-directional ultrasonic vibration may be determined as the second time difference between the departure time of the y-directional ultrasonic vibration from the vibration exciting element 122 (which is the same as the x-directional departure time) and the second arrival time at the second vibration detection element 126. The departure time and the first and second arrival times of the ultrasonic vibrations in the x-direction and the y-direction may be determined based on the peak points of the ultrasonic vibrations in the x-direction and the y-direction. That is, the departure time may be determined based on the peak point of the ultrasonic signal applied to the vibration exciting element 122, and the first and second arrival times may be determined based on the first and second peak points of the first and second analog electrical signals output from the first and second vibration detection elements 124, 126, respectively.

In the processing unit 142 of the computing unit 140, the propagation velocity $$c_{xx}^F$$

of the x-directional longitudinal wave $W_{xx}$ of the ultrasonic wave may be obtained by substituting the obtained value of the propagation distance $d_{xx}$ and the value of the arrival time $t_{xx}$ of the measured x-directional longitudinal wave $W_{xx}$ into the Equation (9-1). Also, the propagation velocity $$c_{yy}^F$$

of the y-directional wave $W_{yy}$ of the ultrasonic wave may be obtained by substituting the obtained value of the propagation distance $d_{yy}$ and the value of the arrival time $t_{yy}$ of the measured y-directional wave $W_{yy}$ into Equation (9-2). Further, in the processing unit 142 of the computing unit 140, the obtained x-directional and y-directional propagation velocities $$c_{xx}^F \text{ and } c_{yy}^F$$

of the ultrasonic waves (longitudinal waves) and the Poisson's ratio v of the structure 10 may be substituted into the previously derived Equation (5-2) for the absolute strain to calculate the absolute strain $\varepsilon_x$ of the structure 10 caused by the x-directional tensile force (step S50).

In this way, according to an embodiment of the present invention, the absolute strain $\varepsilon_x$ of the structure 10 can be calculated in a reference-free manner without reference strain data. In addition, the absolute strain can be obtained using the relationship between the propagation velocity of ultrasonic waves and the absolute strain, derived based on the acoustic elasticity effect, so no physical damage to the structure is required to estimate the absolute strain.

When the magnitude of the absolute strain $\varepsilon_x$ of the structure 10 is thus obtained, the processing unit 142 of the computing unit 140 may assess the calculated absolute strain according to a predetermined criterion to determine an assessment result regarding the health or stability of the structure 10 (step S60).

Figure 5:
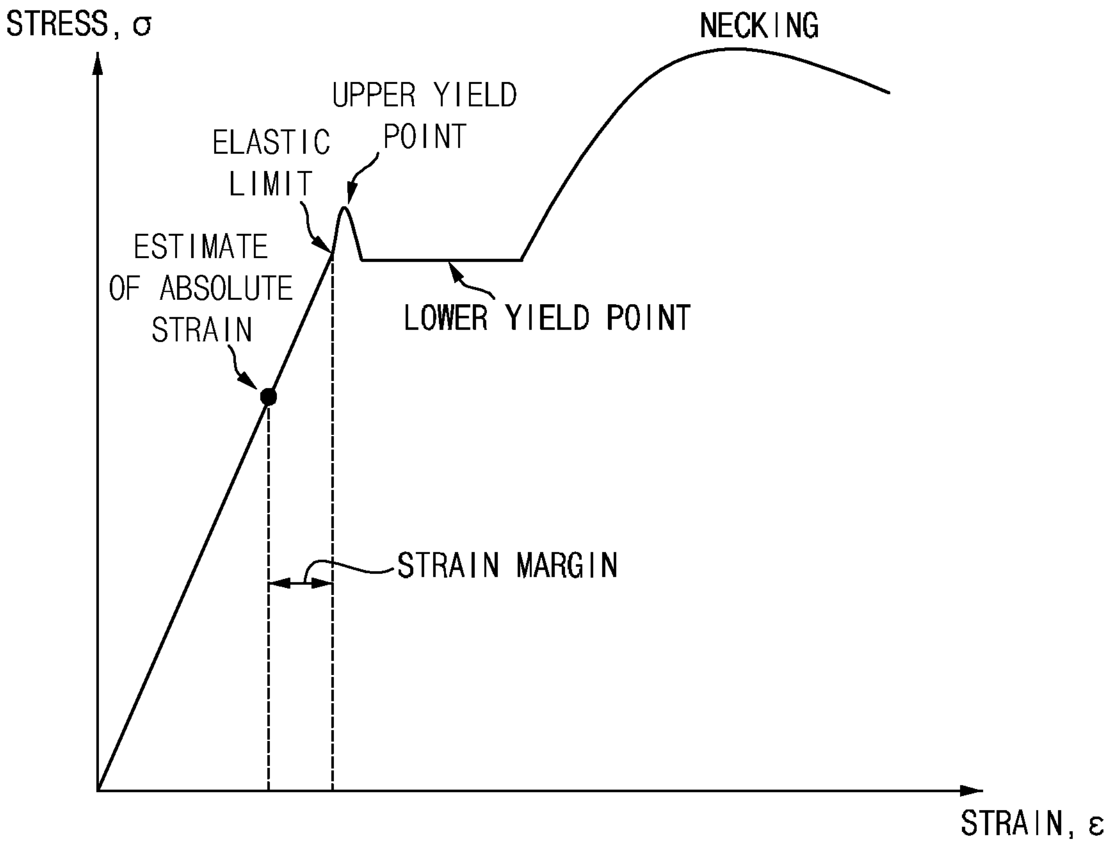
FIG. 5 is a graph depicting a stress-strain plot of a structure.

FIG. 5 shows a stress-strain curve of the structure.

Referring to FIG. 5, the strain margin of the structure can be estimated based on the estimate of the absolute strain of the structure. Specifically, as described above, the absolute strain in the structure is estimated using the propagation velocity of the ultrasonic waves, and then the amount of strain margin of the structure that can be additionally subjected to can be determined by comparing the obtained absolute strain estimate to an elastic limit of the structure in the stress-strain curve of the structure shown. If the strain margin is less than a reference value, it may be determined that the structure is unstable or unhealthy and that measures should be taken to improve its health or stability (e.g., repairing or reinforcing the structure). Conversely, if the strain margin is greater than the reference value, it may be determined that the structure is healthy or stable and does not need to be repaired or reinforced. The processing unit 142 of the computing unit 140 may take necessary follow-up measures based on the health or stability assessment result of the structure 10 obtained in this way, such as immediately notifying a manager or the like when the assessment result indicates that there is a problem with the stability of the structure.

Meanwhile, to verify the performance of the present invention, several tests were conducted on an aluminum flat plate. Specifically, one exciting PZT element (corresponding to the vibration exciting element 122) for generating ultrasonic waves (longitudinal waves) and two sensing PZT elements (corresponding to the first and second vibration detection elements 124, 126) for detecting vibrations to measure the propagating ultrasonic waves (longitudinal waves) were installed at appropriate locations on the aluminum flat plate, and a strain gauge was installed to measure the strain actually generated in the aluminum flat plate. As shown in the configuration of the absolute strain estimation system 100 in FIG. 3, the waveform generator 110 is connected to the exciting PZT element, and the first and second digitizers 132, 134 connected to the processing unit 142 are connected to the two sensing PZT elements, respectively. The test conditions were as shown in Table 1 below.

TABLE 1

| | |
|---|---|
| Test object (structure) | Al 6061-T6 |
| Range of tensile force | 10~80 kN (10 kN step) |
| Input signal | 3-cycle tone-burst input signal at 600 kHz |
| Average count | 500 times |
| Sampling rate | 100 MHz |

In other words, a tensile force was applied to the aluminum flat plate at 10 kN intervals from 10 kN to 80 kN using a universal testing machine (UTM), and for each tensile force, the exciting PZT element generated corresponding ultrasonic vibrations and transmitted them to the aluminum flat plate, causing the ultrasonic vibrations to propagate through the aluminum flat plate. The two sensing PZT elements were used to measure the ultrasonic waves (longitudinal waves) in the x- and y-directions at a sampling rate of 100 MHz At this time, the clock signal and the x- and y-directional ultrasonic (longitudinal) measurement signals were used to detect the arrival times of the x- and y-directional ultrasonic (longitudinal) vibrations. The measurement was performed 500 times and an average value was obtained. From the arrival time and travel distance of the detected ultrasonic vibrations in the two directions, the ultrasonic propagation velocities in both directions were calculated, and an absolute strain of the aluminum flat plate was estimated using the calculated ultrasonic (longitudinal) propagation velocities.

Figure 6:
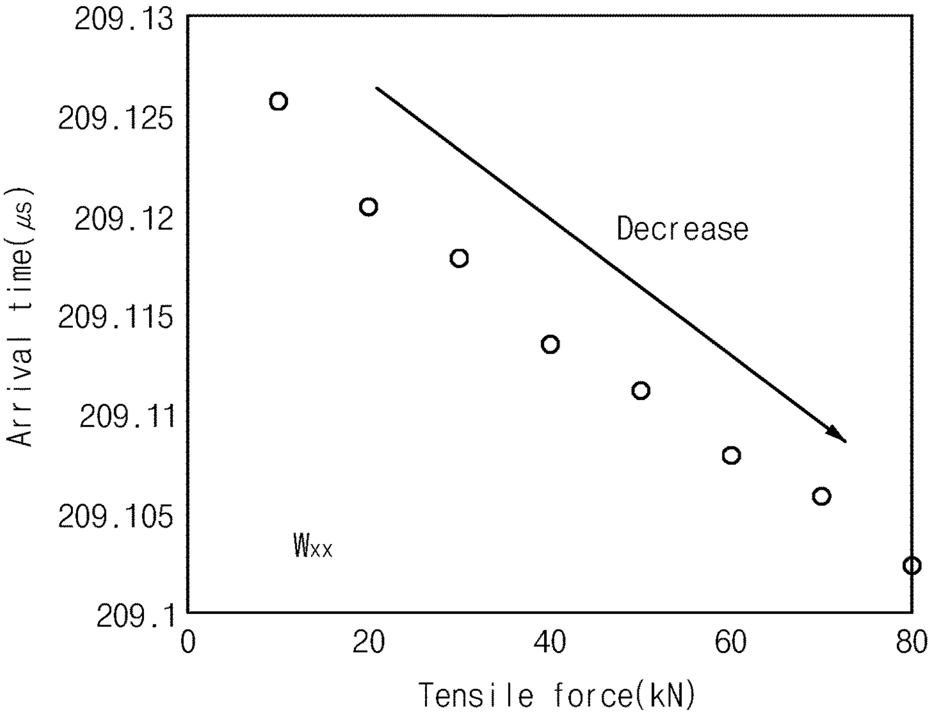
FIG. 6 shows results of fitting a neural network to better detect small ultrasonic velocity changes due to a tensile force.
Figure 6:
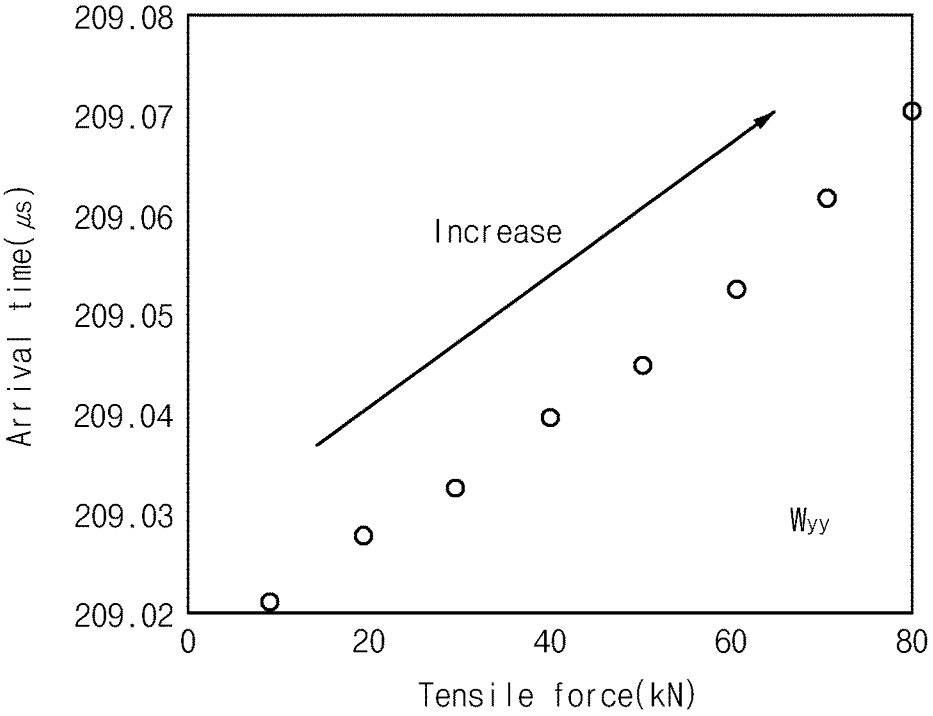

FIG. 6 shows results of fitting a neural network to better detect small ultrasonic velocity changes due to a tensile force.

Referring to FIG. 6, for better detection of small changes in ultrasonic propagation velocity due to tensile force, the measured signals were curve-fitted using neural network fitting, and the ultrasonic signals were reconstructed at 0.0001 ms intervals to obtain higher temporal resolution. Shown in FIG. 6 are the results of the neural network fitting. As mentioned earlier, as the tensile force increased, the ultrasonic wave (longitudinal wave) $w_{xx}$ in the tensile force direction (x-direction) increased in propagation velocity and thus the arrival time of the ultrasonic wave decreased, while the ultrasonic wave (longitudinal wave) $w_{yy}$ in the orthogonal direction (y-direction) to the tensile force direction decreased in propagation velocity and thus the arrival time of the ultrasonic wave increased. Then, considering the change of ultrasonic propagation distance due to tensile force, the velocity ratio $$c_{yy}^F / c_{xx}^F$$

of the longitudinal ultrasonic waves, $W_{xx}$ and $W_{yy}$, was calculated, and the absolute strain estimate of the aluminum flat plate was calculated using the Equation (5-2).

In addition, the strain of the aluminum flat plate was measured with the strain gauge for each tensile force at 10 kN intervals from 10 kN to 80 kN. The strain measured by the strain gauge was used as a true value to calculate an error of the estimated absolute strain.

Figure 7:
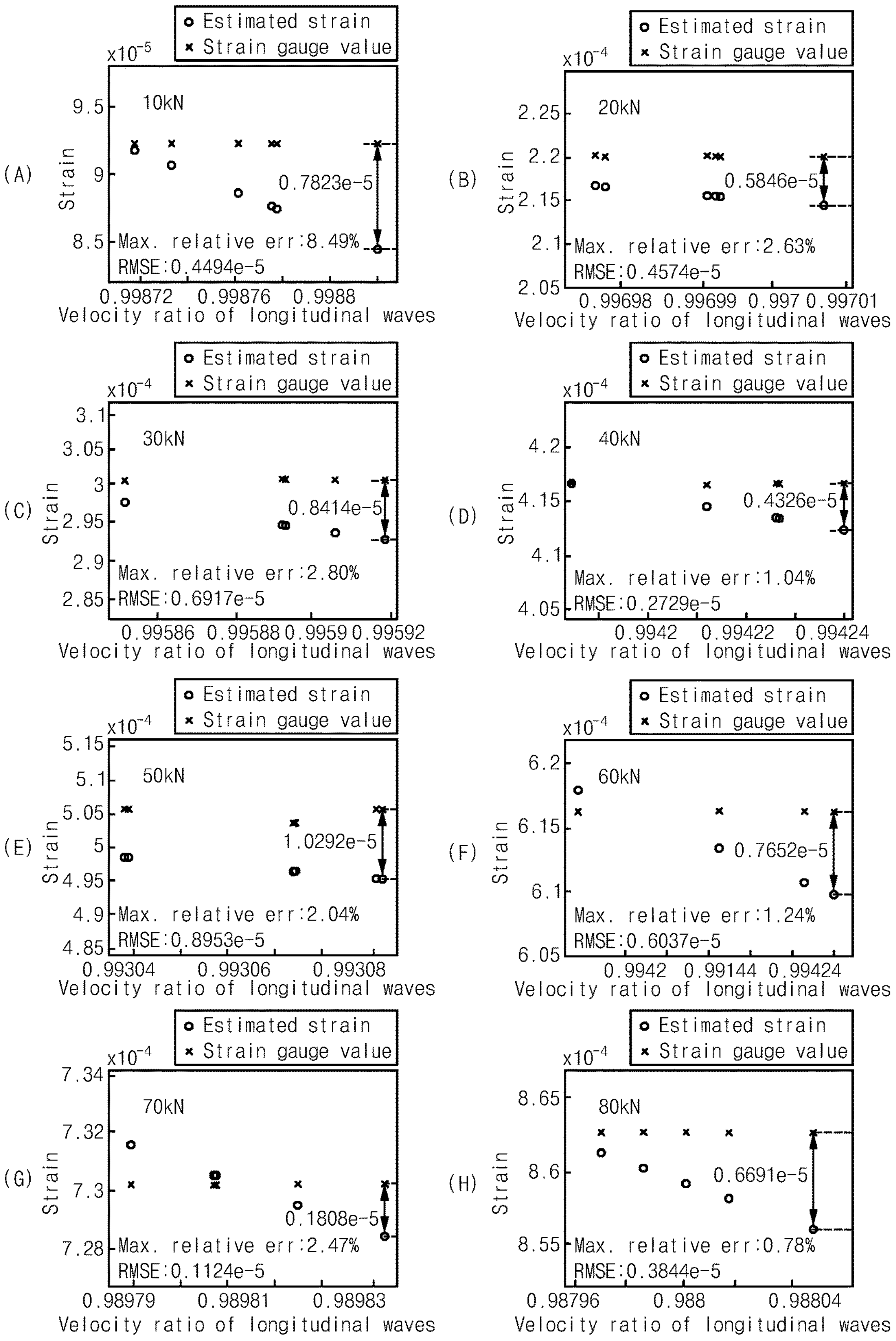
FIG. 7 shows absolute strain estimates obtained while varying the tensile force from 10 kN to 80 kN in 10 kN increments to validate experimentally the present invention.

FIG. 7 shows absolute strain estimates obtained while varying the tensile force from 10 kN to 80 kN in 10 kN increments for experimental validation of the present invention.

In FIG. 7, (A)-(H) show the experimental verification results of the present invention, and the absolute strain estimation result measured by varying the tensile force from 10 kN to 80 kN at 10 kN intervals. According to the calculation results, the maximum relative error is about 8.49% and the maximum root mean square error (RMSE) is about $0.8953e^{-5}$, confirming that the absolute strain can be estimated with high accuracy. For the strain gauge, the strain was measured by attaching it before introducing the tensile force, but the technology provided by the present invention can estimate the absolute strain without any basis data. The experimental results confirm that the technology according to the present invention can be applied to structures in common use to estimate absolute strain, unlike strain gauges.

The present invention can be widely used for health or stability diagnosis and monitoring of structures such as bridges, buildings, towers, etc.

The foregoing is illustrative of example embodiments and is not to be construed as limiting thereof. Although a few example embodiments have been described and illustrated by means of limited drawings, it will be understood by those skilled in the art that various modifications and changes can be made to the present invention without departing from the ideas and scope of the present invention described in the following patent claims. For example, suitable results may be achieved even if the described embodiments are performed in a different order than the described methods, and/or the components of the described systems, structures, devices, circuits, etc. are combined or assembled in a different form than the described ones, or substituted or replaced by other components or equivalents. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of estimating an absolute strain of a structure under a tensile force, comprising:

detecting a propagation velocity $$(c_{xx}^F)$$

of a first ultrasonic vibration propagating in a tensile force direction and a propagation velocity $$(c_{yy}^F)$$

of a second ultrasonic vibration propagating in another direction orthogonal to the tensile force direction in the structure by applying ultrasonic vibrations to the structure; and calculating, with a processor, an absolute strain ($\varepsilon_x$) of the structure in the tensile force direction due to the tensile force using the detected propagation velocities $$(c_{xx}^F,\ c_{yy}^F)$$

of the first and second ultrasonic vibrations and a relationship between propagation velocities of the ultrasonic vibrations and a strain in the structure, wherein the relationship is defined by an equation, $$\varepsilon_x = \frac{\left(\frac{c_{yy}^F}{c_{xx}^F}\right)^2 - 1}{21\left[\left(\frac{c_{yy}^F}{c_{xx}^F}\right)^2 + v\right]},$$

where v is a Poisson's ratio of the structure, and wherein the 'detecting propagation velocities' comprises: inputting an ultrasonic signal generated by a waveform generator to a vibration exciting element fixed to the structure to cause the vibration exciting element to generate ultrasonic vibrations to be propagated within the structure; detecting the first and second ultrasonic vibrations by first and second vibration detection elements installed at first and second positions of the structure, respectively, to output corresponding first and second analog electrical signals, respectively, wherein the first position is spaced apart from the vibration exciting element by a first predetermined distance in the tensile force direction of the tensile force, and the second position is spaced apart from the vibration exciting element by a second predetermined distance in the another direction orthogonal to the tensile force direction; converting the first and second analog electrical signals, by a digitizing unit, provided from the first and second vibration detection elements to first and second digital signals; and calculating the propagation velocities $$(c_{xx}^F,\ c_{yy}^F)$$

of the first and second ultrasonic vibrations using the first and second digital signals by executing an absolute strain estimation program with the processor.

2. The method of claim 1, wherein the propagation velocity $$(c_{xx}^F)$$

of the first ultrasonic vibration is calculated by dividing the first predetermined distance by a first arrival time taken for the first ultrasonic vibration to propagate from the vibration exciting element to the first vibration detection element, and the propagation velocity $$(c_{yy}^F)$$

of the second ultrasonic vibration is calculated by dividing the second predetermined distance by a second arrival time taken for the second ultrasonic vibration to propagate from the vibration exciting element to the second vibration detection element.

3. The method of claim 2, wherein the first arrival time is determined by a first time difference between a departure time of the first ultrasonic vibration from the vibration exciting element and a first arrival time at the first vibration detection element, and the second arrival time is determined by a second time difference between the departure time and a second arrival time of the second ultrasonic vibration at the second vibration detection element, wherein the first and second arrival times are determined based on peak points of the first and second ultrasonic vibrations.

4. The method of claim 1, further comprising assessing stability of the structure by evaluating the calculated absolute strain ($\varepsilon_x$) of the structure in the tensile force direction based on a predetermined criterion.

5. The method of claim 4, wherein the 'assessing stability of the structure' include comparing the calculated absolute strain ($\varepsilon_x$) of the structure in the tensile force direction with an elastic limit of the structure on a stress-strain curve of the structure to obtain a strain margin of the structure; determining that if the obtained strain margin is less than a reference value, stability of the structure is low enough to require measures to improve health of the structure; and determining that if the obtained strain margin is greater than the reference value, the structure is healthy.

6. A system for estimating an absolute strain of a structure under a tensile, comprising:

a velocity detection unit configured to detect a propagation velocity $$(c_{xx}^F)$$

of a first ultrasonic vibration propagating in a tensile force direction and a propagation velocity $$(c_{yy}^F)$$

of a second ultrasonic vibration propagating in another direction orthogonal to the tensile force direction in the structure by applying ultrasonic vibrations to the structure; and a strain calculating unit configured to calculate, an absolute strain ($\varepsilon_x$) of the structure in the tensile force direction due to the tensile force using the detected propagation velocities $$(c_{xx}^F, c_{yy}^F)$$

of the first and second ultrasonic vibrations and a relationship between propagation velocities of the ultrasonic vibrations and a strain in the structure, wherein the relationship is defined by an equation, $$\varepsilon_x = \frac{\left(\frac{c_{yy}^F}{c_{xx}^F}\right)^2 - 1}{21\left[\left(\frac{c_{yy}^F}{c_{xx}^F}\right)^2 + v\right]},$$

where v is a Poisson's ratio of the structure, and wherein the velocity detection unit comprises a waveform generator configured to generate an ultrasonic vibration exciting signal; a vibration exciting element, attached to the structure and configured to be vibrated by the ultrasonic vibration exciting signal from the waveform generator to cause vibrations to be propagated within the structure; a first vibration detection element, installed at a first position of the structure spaced apart from the vibration exciting element by a first predetermined distance in the tensile force direction and configured to detect a first ultrasonic vibration propagating in the tensile force direction and to output a corresponding first analog signal; and a second vibration detection element, installed at a second position of the structure spaced apart from the vibration exciting element by a second predetermined distance in the another direction orthogonal to the tensile force direction and configured to detect a second ultrasonic vibration propagating in the another direction orthogonal to the tensile force direction, and to output a corresponding second analog signal.

7. The system of claim 6, wherein the vibration exciting element and the first and second vibration detection elements are elements made from piezoelectric ceramic (PZT) material.

8. The system of claim 6, wherein the strain calculating unit comprises a digitizing unit configured to convert the first and second analog signals into first and second digital signals, respectively; and a computing unit configured to perform functions of calculating, by executing an absolute strain estimation program, the propagation velocity $$(c_{xx}^F)$$

of the first ultrasonic vibration and the propagation velocity $$(c_{yy}^F)$$

of the second ultrasonic vibration after receiving the first and second digital signals from the digitizing unit; and applying the calculated propagation velocities $$(c_{xx}^F, c_{yy}^F)$$

of the first and second ultrasonic vibrations to the relationship to calculate the absolute strain ($\varepsilon_x$) of the structure in the tensile force direction.

9. The system of claim 8, wherein in the computing unit, the propagation velocity $$(c_{xx}^F)$$

of the first ultrasonic vibration is calculated by dividing the first predetermined distance by a first arrival time taken for the first ultrasonic vibration to propagate from the vibration exciting element to the first vibration detection element, and the propagation velocity $$(c_{yy}^F)$$

of the second ultrasonic vibration is calculated by dividing the second predetermined distance by a second arrival time taken for the first ultrasonic vibration to propagate from the vibration exciting element to the second vibration detection element.

10. The system of claim 9, wherein the first arrival time is determined by a first time difference between a departure time of the first ultrasonic vibration from the vibration exciting element and a first arrival time at the first vibration detection element, and the second arrival time is determined by a second time difference between the departure time and a second arrival time of the second ultrasonic vibration at the second vibration detection element, wherein the first and second arrival times are determined based on peak points of the first and second ultrasonic vibrations.

11. The system of claim 8, wherein the digitizing unit comprises a first digitizing unit configured to receive the first analog signal from the first vibration detection element and convert the first analog signal to the first digital signal; and a second digitizing unit configured to receive the second analog signal from the second vibration detection element and convert the second analog signal to the second digital signal.

12. The system of claim 8, wherein the computing unit is configured to further perform a function of assessing stability of the structure by evaluating the calculated absolute strain ($\varepsilon_x$) of the structure in the tensile force direction based on a predetermined criterion.

13. The system of claim 12, wherein the function of 'assessing stability of the structure' comprises comparing the calculated absolute strain ($\varepsilon_x$) of the structure in the tensile force direction with an elastic limit of the structure on a stress-strain curve of the structure to obtain a strain margin of the structure; determining that if the obtained strain margin is less than a reference value, stability of the structure is low enough to require measures to improve health of the structure; and determining that if the strain margin is greater than the reference value, the structure is healthy.

14. The system of claim 8, wherein the computing unit comprises a clock generator configured to generate a clock signal used as a reference for operations; and a processing device configured to execute the absolute strain estimation program, to perform operations to calculate, based on the clock signal, the propagation velocities $$(c_{xx}^F,\ c_{yy}^F)$$

of the first and second ultrasonic vibrations and the absolute strain ($\varepsilon_x$) of the structure in the tensile force direction, and to control the waveform generator to generate the ultrasonic vibration exciting signal.

* * * * *